United States Patent [19]
Islam

[11] Patent Number: 5,101,456
[45] Date of Patent: Mar. 31, 1992

[54] PREDISTORTION APPARATUS FOR OPTICAL LOGIC DEVICE

[75] Inventor: Mohammed N. Islam, Hazlet, N.J.

[73] Assignee: AT&T Bell Laboratories, Murray Hill, N.J.

[21] Appl. No.: 609,959

[22] Filed: Nov. 7, 1990

[51] Int. Cl.$^5$ .......................... G02B 6/26; G06F 7/00; H03K 17/80; G02F 1/00

[52] U.S. Cl. ........................................ 385/27; 385/11; 385/32; 385/33; 385/36; 385/37; 364/715.01; 307/407; 356/351; 359/173; 359/184

[58] Field of Search ............... 350/96.10, 96.15, 96.16, 350/96.29, 96.30; 364/713, 715.01, 712, 822, 900, 807; 307/407, 409, 425, 429, 430, 1, 2, 3, 4; 455/600, 608, 610, 612; 356/345, 351

[56] References Cited

U.S. PATENT DOCUMENTS

| | | | |
|---|---|---|---|
| 4,856,092 | 8/1989 | Wade | 455/609 |
| 4,913,507 | 4/1990 | Stamnitz et al. | 350/96.15 |
| 4,913,520 | 4/1990 | Kafka | 350/96.30 |
| 4,928,316 | 5/1990 | Heritage et al. | 455/608 |
| 4,932,739 | 6/1990 | Islam | 350/96.15 |
| 4,962,987 | 10/1990 | Doran | 350/96.15 |
| 4,973,122 | 11/1990 | Cotter et al. | 350/96.15 |
| 4,995,690 | 2/1991 | Islam | 350/96.15 |
| 5,020,050 | 5/1991 | Islam | 370/4 |

OTHER PUBLICATIONS

A. Hasegawa et al., Appl. Phys. Lett., vol. 23, No. 3, Aug. 1, 1973, "Transmission of stationary nonlinear optical . . . ", pp. 142–144.

C. R. Menyuk, Optics Letters, vol. 12, No. 8, Aug. 1987, "Stability of solitons in birefringenet . . . ", pp. 614–616.

O. E. Martinez, IEEE J. of Quantum Elec., vol. QE-23, No. 1, Jan. 1987, "3000 Times Grating Compressor with Positive . . . ", pp. 59–64.

C. R. Menyuk, J. Opt. Soc. Am. B., vol. 5, No. 2, Feb. 1988, "Stability of solitons in birefringenent optical . . . ", pp. 392–402.

M. N. Islam, Optics Letters, vol. 15, No. 8, Apr. 15, 1990, "All-Optical Cascadable NOR Gate with Gain", pp. 417–419.

Primary Examiner—Brian Healy
Attorney, Agent, or Firm—Gregory C. Ranieri

[57] ABSTRACT

Timing restrictions for coincidence of control and data signal pulses to a soliton-based optical logic device are significantly relaxed by predistorting a characteristic of data signal pulses input to the device. Predistortion in the form of normal dispersion is sufficient to cause each predistorted data signal pulse to change shape subsequently in the optical logic device and thereby permit effective interaction between the data signal pulses and the control pulses to achieve the desired result of the logic operation. The temporal separation between control and data signal pulses has been extended to cover a total range of up to four pulse widths without degrading the operation of the optical logic device.

12 Claims, 4 Drawing Sheets

PREDISTORTION APPARATUS FOR OPTICAL LOGIC DEVICE

TECHNICAL FIELD

This invention relates to optical logic devices and, more particularly, to devices which operate on soliton pulses.

BACKGROUND OF THE INVENTION

Ultra-high speed optical logic devices are needed to continue growth of such emerging technologies as optical computing and optical switching. All-optical, cascadable soliton logic devices have recently been demonstrated in birefringent optical fiber to provide several picojoule switching energy and a fan-out of six. See, for example, *Opt. Lett.*, Vol. 15, pp. 417 et seq. (1990). Logic outputs for this family of logic devices are presented according to a time-shift-keying criterion. That is, a logical "1" corresponds to the occurrence of a control pulse within a desired time slot or sampling interval, whereas a logical "0" corresponds to the substantial absence of the pulse during the desired time slot or sampling interval. Logic operations are performed by slowing or "time-shifting" the control pulse through interactions with a signal pulse within the birefringent optical fiber. The interactions produce a soliton dragging effect.

Solitons are nonlinear optical pulses which propagate in optical fiber without dispersing provided the soliton wavelength corresponds to anomalous group velocity dispersion within the birefringent fiber. Birefringence is a material property which causes two different polarization states to propagate at different velocities because the material has a different refractive index for each polarization state, namely, an ordinary and extraordinary indices of refraction. Solitons having different polarization states can travel at different group velocities due to birefringence of the fiber. When one pulse propagates past another pulse, a condition called "walk-off", each pulse induces a frequency shift of the center frequency of the pulse. This frequency shift is referred to as a "chirp". Frequency shifts of the pulse are translated into time shifts via fiber group velocity dispersion in the remaining length of fiber.

For the optical logic devices described above, the control pulse is introduced on the fast axis of the birefringent fiber while the data signal pulse is introduced along the slow axis of the fiber. It has been required that the interaction of the pulses during walk-off be asymmetric so that a net chirp occurs. Symmetry of the interaction causes the chirp induced during the first half of the interaction (when pulses walk toward each other) to be exactly cancelled by the chirp induced during the second half of the interaction (when pulses walk off from each other). Asymmetry is achieved by having substantially coincident or overlapping control and data signal pulses so that the pulses appear only to "walk off" from each other. To achieve the necessary degree of interaction in the fiber, an overlap or coincidence of pulses input to the device on the order of one pulse width has been suggested. Pulse widths of several hundred femtoseconds have been demonstrated with this family of logic devices.

For such ultra-high speed device operation, an undue amount of care for pulse timing is necessary to assure that control and data pulses properly coincide at the input of an optical logic device situated within a large array of such devices. In turn, this means that each signal path must be treated as a critical timing path. Fiber lengths must be accurately trimmed to meet the stringent pulse timing requirements.

SUMMARY OF THE INVENTION

Relaxed timing restrictions for soliton based logic devices are achieved by predistorting a characteristic of the data signal pulse prior to introducing the pulse to the optical logic device. The predistortions cause the data signal pulse to change its shape during the period when it interacts with the control pulse, that is, during walk-off in the birefringent soliton fiber of the optical logic device. An exemplary class of elements for realizing such predistortions includes dispersive elements exhibiting normal group velocity dispersion at the wavelength of interest.

In operation, the data signal pulse is predistorted by propagating through an element having a predetermined amount of normal group velocity dispersion. After the distorted data signal pulse is introduced into the optical logic device, it changes shape again as it propagates through the the optical logic device and, more particularly, the birefringent fiber therein at a wavelength for which the fiber exhibits anomalous group velocity dispersion. This shape change causes a variation of the nonlinear index of the fiber as seen by the control pulse and thereby permits the necessary interaction between the control and data pulses to perform the logic function. Accordingly, predistortion of the data signal pulse permits the data pulse and the control pulse to be other than substantially overlapping or coincident in time.

In accordance with the principles of the present invention, timing constraints are sufficiently relaxed to permit the temporal separation between the data signal pulses and the control pulse to be as large as three pulse widths without degrading operation of the logic device. Several illustrative examples of dispersive elements suitable for use in performing predistortion include dispersion shifted optical fiber, an anti-parallel dispersion grating pair, and a Gires-Tournoir interferometer.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
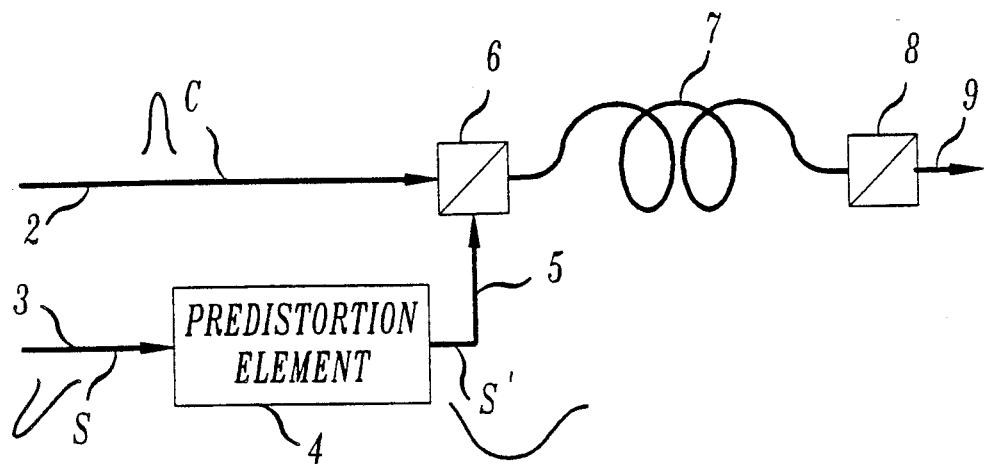
FIG. 1 shows a predistortion element in combination with an optical logic device in accordance with the principles of the invention.

FIG. 1 shows an improved optical logic apparatus in which a predistortion element is connected to an input port of a soliton based optical logic device to permit greater relaxation of timing restrictions on input pulses. In prior art devices, it was required that control signal C and data signal S substantially coincide or overlap at the input stage of the optical logic device in order to provide the opportunity for a suitable interaction (e.g., soliton dragging) to occur in the device. In accordance with the principles of the present invention, the inclusion of a predistortion element as shown in FIG. 1 causes the data signal to undergo a predetermined distortion through dispersive effects so that the distorted data signal undergoes a subsequent change in shape in the optical logic device during the time period when it is interacting with the control signal. The subsequent change and interaction cause a frequency shift of the control signal which via the fiber dispersion is converted to the time shift needed for operation of the logic. By utilizing the predistortion element, it is possible to compensate of timing misalignments between the control signal and the data signal. That is, the control and data signals need not coincide in time at the input (paths 2 and 3) of the optical apparatus.

As shown in FIG. 1, control signal C is supplied via optical fiber 2 to a first input port of optical logic device 1. Data signal S is supplied along optical fiber 3 to predistortion element 4 which, in turn, is connected via optical fiber 5 to a second input port of optical logic device 1. The polarization of signals S and S' is generally orthogonal to the polarization of signal C. It is contemplated that the apparatus is realizable with only signals S' and C orthogonally polarized. Control signal C is usually oriented similarly to the fast axis of the birefringent fiber in device 1.

Optical logic device 1 has been described in several exemplary embodiments in U.S. Pat. No. 5,020,050 U.S. patent application Ser. No. 609,958, pending, filed on even data herewith, both of whose teachings are expressly incorporated herein by reference. In simplified form, optical logic device 1 is shown consisting of polarization beam splitter 6 connected to birefringent fiber 7 and output polarization beam splitter 8. Output from the optical logic device is provided via optical fiber 9 or by other suitable means which permit optical coupling with polarization beam splitter 8.

Before continuing with a description of the present invention, it is desirable to provide a more detailed understanding of the soliton based optical logic device because it is the cooperation of the device with the predistortion element which allow realization of the present invention. Optical logic device 1 which performs combinatorial logic functions is cascadable with a controllably large amount of fanout and provides gain. These devices accept one or more input data signals and a control signal during a particular time slot or window. The time slot, as is discussed below, is generally related to a c racteristic of the data signal and control signal pulse width such as the full width half maximum (FWHM). In general, when one or more of the data signals occurs during the same time slot or window as the control signal, the soliton based optical logic device through interaction between the data signals and the control signal causes the control signal to be moved to a neighboring time slot which may or may not be directly adjacent to the original time slot. That is, the control signal is effectively removed from the time slot in which it originally occurred. The logical output state of the optical logic device is then determined by observing the presence or absence of the control signal during the original time slot.

Gain is afforded in the optical logic device by employing control signals which are larger than the corresponding data signals. Gain results from having a relatively low level signal control a much larger signal. As a result of the device gain, optical logic devices are cascadable without a need for signal amplification between cascaded devices. Moreover, because each optical logic device generates a high level output signal corresponding to the level of the control signal and further because input data signals are at a relatively low level, it is possible to divide the device output signal into a plurality of signals which are supplied to subsequent combinatorial logic devices. Division of an output signal in this manner is commonly called fanout.

The optical signals employed by the optical logic device shown in FIG. 1 comprise at least control pulses commonly known as solitons. At the present time, soliton-based systems appear to be the most desirable candidate system for incorporating optical logic devices of the type presented herein. In order to gain a better understanding of the soliton based optical logic device shown in the figures, a brief overview of solitons is presented below.

Fourier transform limited optical pulses propagating through an optical fiber experience pulse spreading due to a variation of group velocity called group velocity dispersion. Group velocity dispersion results from a linear dependence of the index of refraction on spectral frequency. That is, different spectral portions of an optical pulse travel at a different group velocity which, in turns, leads to a temporal broadening of the propagating optical pulse. Additonally, the fiber has a third-order nonlinear effect (self-phase modulation) in which its refractive index, n, depends on the light intensity, I, through the formula, $n = n_0 + n_2 I$, where $n_0$ is the linear refractive index and $n_2$ is the nonlinear refractive index. Balancing the negative group velocity dispersion with this nonlinear, intensity dependent effect gives rise to the formation of a soliton in the fiber. An input optical field of the form given by $u = (1 + a) \text{sech}(t)$ contains a fundamental soliton when the amplitude, a, lies in the range of $-\frac{1}{2} < a < \frac{1}{2}$. Furthermore, the peak power, $P_1$, of an optical pulse with pulse duration, $\tau$, required to generate a single soliton in a single-mode fiber with effective-mode field area $A_{eff}$ is given by $$P_1 = \frac{\lambda A_{eff}}{4 n_2 Z_0}, \tag{1}$$

$$Z_0 = \frac{0.322 \pi^2 c \tau^2}{\lambda^2 |D|}, \tag{2}$$

where $P_1$ is the fundamental soliton power, $Z_0$ is the soliton period, and D is the dispersion in psec/nm.km. For a more detailed explanation of solitons, see Hasegawa et al., *Appl. Phys. Lett.*, Vol. 23, No. 3, pp. 142–44, (1973).

Recently, it has been shown in principle that orthogonally polarized solitons of substantially equivalent amplitudes can trap one another and travel as a unit because of an intensity dependent effect that compensates for the birefringence. See C. R. Menyuk, *Optics Letter*, Vol. 12, No. 8 pp. 614–6 (1987) and C. R. Menyuk, *J. Opt. Soc. Am. B.*, Vol. 5, No. 2 pp. 392–402 (1988). Specifically, two equivalent level soliton pulses are caused to shift their center spectral frequency in opposite directions such that, through group velocity dispersion, the soliton pulse traveling along the fast axis slows down while the soliton pulse traveling along the slow axis speeds up. As the group velocity of each soliton pulse reaches equilibrium, the soliton pulses travel as an unit. Additionally, the trapped soliton pair appears at the output of the fiber at a time, $t+\Delta t$, where t is the time at which a single soliton would have appeared at the output.

When the orthogonal soliton pulses are of vastly different amplitudes, the trapping effect is insignificant and the time delay or "dragging" effect is accentuated with respect to the larger soliton pulse. The soliton dragging effect is affected by the overlap in time of the orthogonal pulses and their relative amplitudes. It has been determined in general that, when the smaller pulse overlaps the larger pulse within approximately one soliton pulse width of the center of the larger pulse, soliton dragging occurs. The overlap may be decreased, that is, the pulses may be separated farther, for pulses of somewhat more comparable amplitude. For pulses having significantly different amplitudes, it is necessary to follow the rule of thumb given previously. It is now understood that the effects described above are realizable when only one of the pulses (e.g., the larger control pulse) is of a fundamental soliton nature.

For the soliton based optical logic device, a birefringent fiber is generally required. Birefringent optical fibers have a birefringence induced by strain, material composition, geometry or the like. Birefringence is measured as the difference in refractive indices between the ordinary and extraordinary axes or polarization directions (e.g., $\Delta n \approx 10^{-5}$). In practice, the control signal is supplied in a polarization oriented with the fast axis of birefringent fiber 7, while the data signal or signals are supplied in the orthogonal polarization which corresponds to the slow axis of fiber 7.

Data signals are discarded at the output of optical logic device 1 through the use of polarization beam splitter 8. Polarization beam splitter 8 permits only control signal C to emerge in a delayed or undelayed manner, via time-shift-keying, at the output port of the optical logic device.

Predistortion element 4 subjects data signal S to a predetermined amount of distortion via normal dispersion as the data signal propagates through the predistortion element. Distorted data signal S' emerges from predistortion element 4 with a temporal broadening of a shape characteristic in the distorted data signal, that is, a pulse shape change, induced by the normal dispersive effects of predistortion element 4. When distorted data signal S' enters optical logic device 1 and, more particularly, birefringent fiber 7 in optical logic device 1, the distorted data signal compresses in time and undergoes a substantially continuous change in amplitude as a result of the anomalous group velocity dispersion exhibited by fiber 7 at the wavelength of the distorted data signal. These changes in the distorted data signal permit the distorted data signal to interact effectively with the control signal through variations of the fiber nonlinear index so that the desired optical logic function of device 1 is performed. The effective interaction is understood to be an asymmetric walk-off condition in the birefringent fiber between the control signal pulse and the distorted data signal pulse.

While input fibers have been suggested as elements 2, 3, and 5 for the apparatus shown in FIG. 1, it is understood by those skilled in the art that any element which provides the necessary degree of optical coupling may be utilized in place of the optical fiber.

Predistortion element 4 is realized as an optical element which provides a prescribed amount of normal group velocity dispersion for pulses propagating through the element. Exemplary embodiments of predistortion element 4 include an antiparallel grating pair (FIG. 2), a Gires-Tournoir interferometer (FIG. 3), and a dispersion shifted optical fiber (FIG. 4) exhibiting normal dispersion at the wavelength associated with data signal S.

Figure 2:
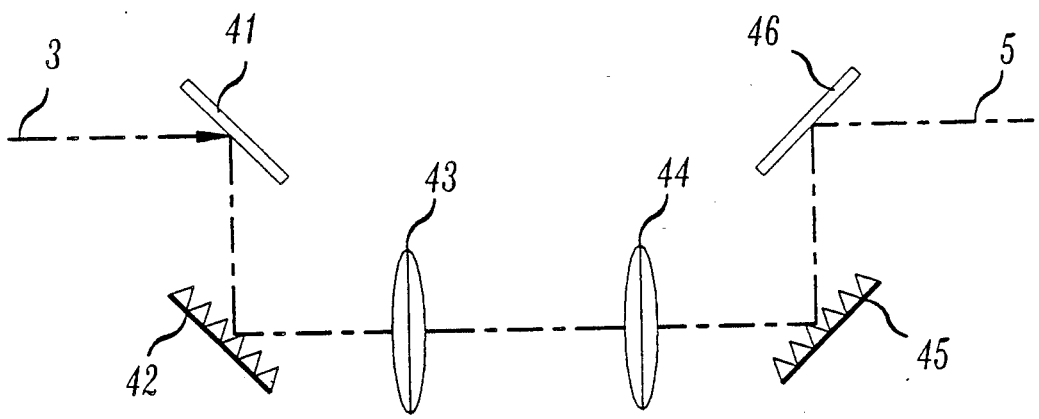
FIGS. 2 through 4 show specific illustrative embodiments of the predistortion element in FIG. 1.

The antiparallel grating pair shown in FIG. 2 comprises input mirror 41 for coupling data signal S onto diffraction grating 42, lenses 43 and 44 for focusing the signal from diffraction grating 42 onto diffraction grating 45, and output mirror 46 for directing the signal from diffraction grating 45 to the output port of predistortion element 4. This type of device has been described in a technical article by O. E. Martinez in *IEEE Journal of Quantum Electronics*, Vol. QE-23, page 59 et seq. (1987). It should be noted that optical prisms arranged in series similar to gratings 42 and 45 may be employed to provide the desired group velocity dispersion. One advantage of the dispersion grating or prism pair is that the series arrangement may be adjusted to obtain both normal and anomalous group velocity dispersion over an extremely broad range, namely, 100 ps/nm. While this arrangement can yield large dispersion values, it is bulky covering almost six square feet and introduces a substantial amount of loss.

Figure 3:
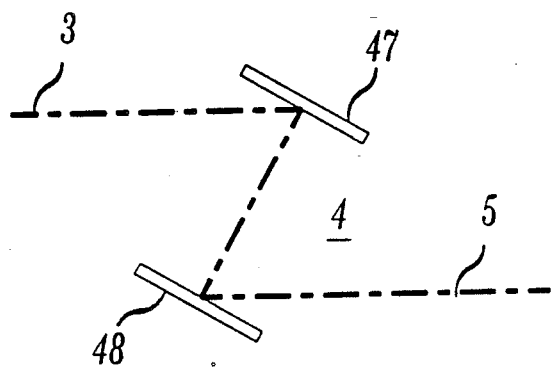

The Gires-Tournoir interferometer shown in FIG. 3 is realized by using reflectors 47 and 48 arranged in parallel to intercept the data signal input to predistortion element 4 as shown in FIG. 3. This interferometer is well known to those skilled in the art and described in *IEEE Trans. on Quantum Electronics*, Vol. QE-22, pp. 182 et seq. (1986) and in *C.R. Acad. Sci. Paris*, Vol. 258, page 6112 (1964). One advantage of this type of interferometer is that it can be made to have low insertion loss with a variable amount of dispersion. The reflector elements are simply realizable as stacks of dielectric material layers grown on mirror surfaces. Since the dispersion per pass of an optical signal is small, it is generally necessary to adjust reflector elements 47 and 48 to permit multiple passes of the data signal therebetween. One difficulty noted with this type of interferometer concerns the ability to obtain a uniformly constant dispersion characteristic over the entire pulse spectral width for data signal pulses.

Figure 4:
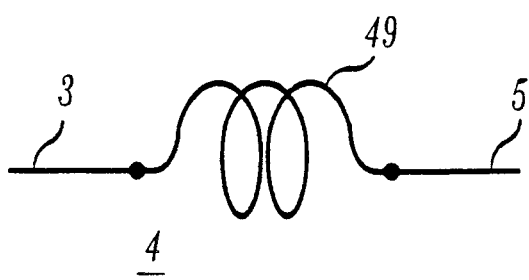

FIG. 4 shows another embodiment of predistortion element 4 wherein a dispersion shifted fiber 49 is utilized to provide normal dispersion at the wavelength associated with data signal S. One advantage of using dispersion shifted fiber is that it is compatible with other fiber components utilized in the apparatus. It is understood by those skilled in the art that fiber 49 can provide a different amount of dispersion by either changing the fiber length or by changing the wavelength of data signal S. Because of its simplicity and compatibility, the fiber realization of predistortion element 4 as shown in FIG. 4 is employed in the examples discussed below. In these examples, fiber 49 comprise a section of commercially available, polarization maintaining, PANDA fiber. The section of fiber was approximately 3.65 meters long and displayed a core diameter of 4.3 μm, a core-cladding difference of approximately 0.029, and a zero dispersion wavelength beyond 2 μm.

Figure 5:
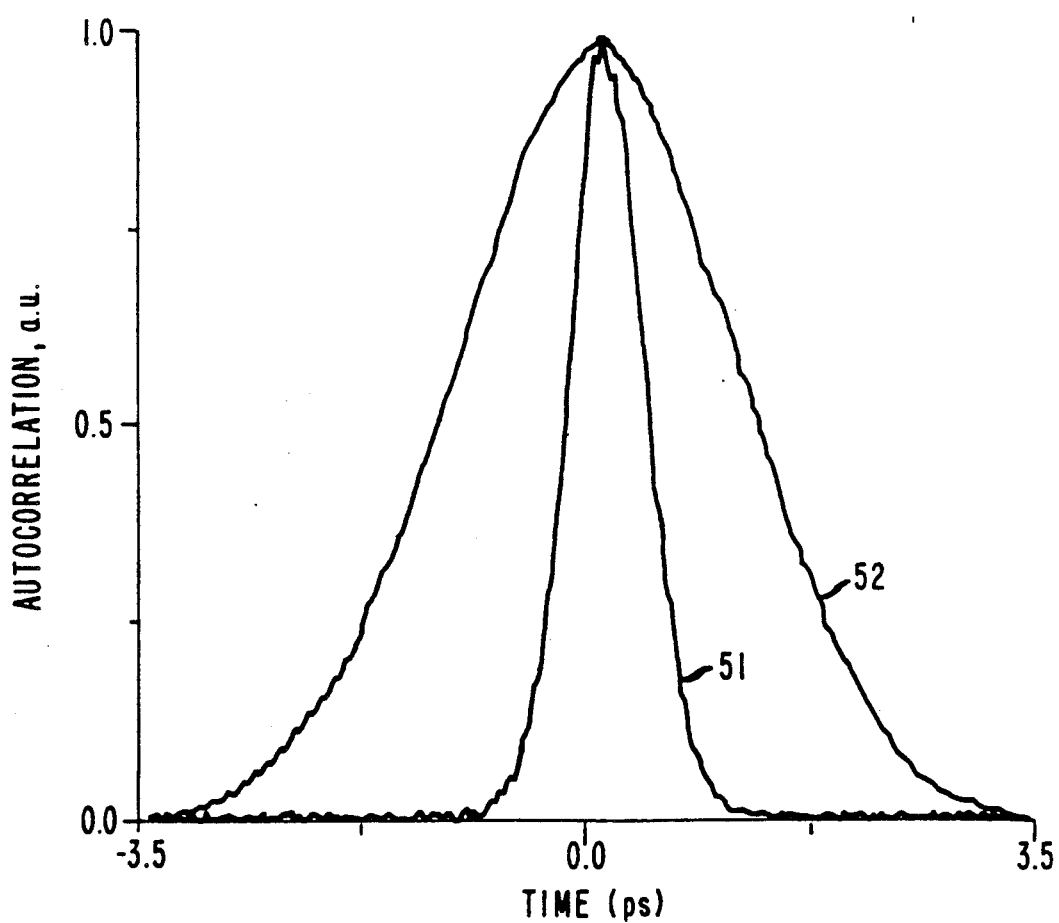
FIG. 5 shows autocorrelations of input pulse and of output pulses for the exemplary predistortion element in FIG. 4 to illustrate the existence of pulse broadening.

Autocorrelation of input pulses to the exemplary fiber 49 is shown as curve 51 in FIG. 5. While the autocorrelation pulse shows a FWHM of approximately 710 fs, the FWHM for output pulses was approximately 500 fs. The autocorrelation of output pulses emerging from exemplary fiber 49 is shown as curve 52 in FIG. 5. The autocorrelation pulse exhibits an FWHM of approximately 2.55 ps whereas the FWHM for output pulses is approximately 1.8 ps. The normal dispersion and self phase modulation in fiber 49 cause the data signal to broaden by a factor of approximately 3.6. This broadening is utilized to permit interaction of the distorted data signal and the control signal in the optical logic device even though the data signal S and the control signal are separated by a significant number of pulse widths.

Figure 6:
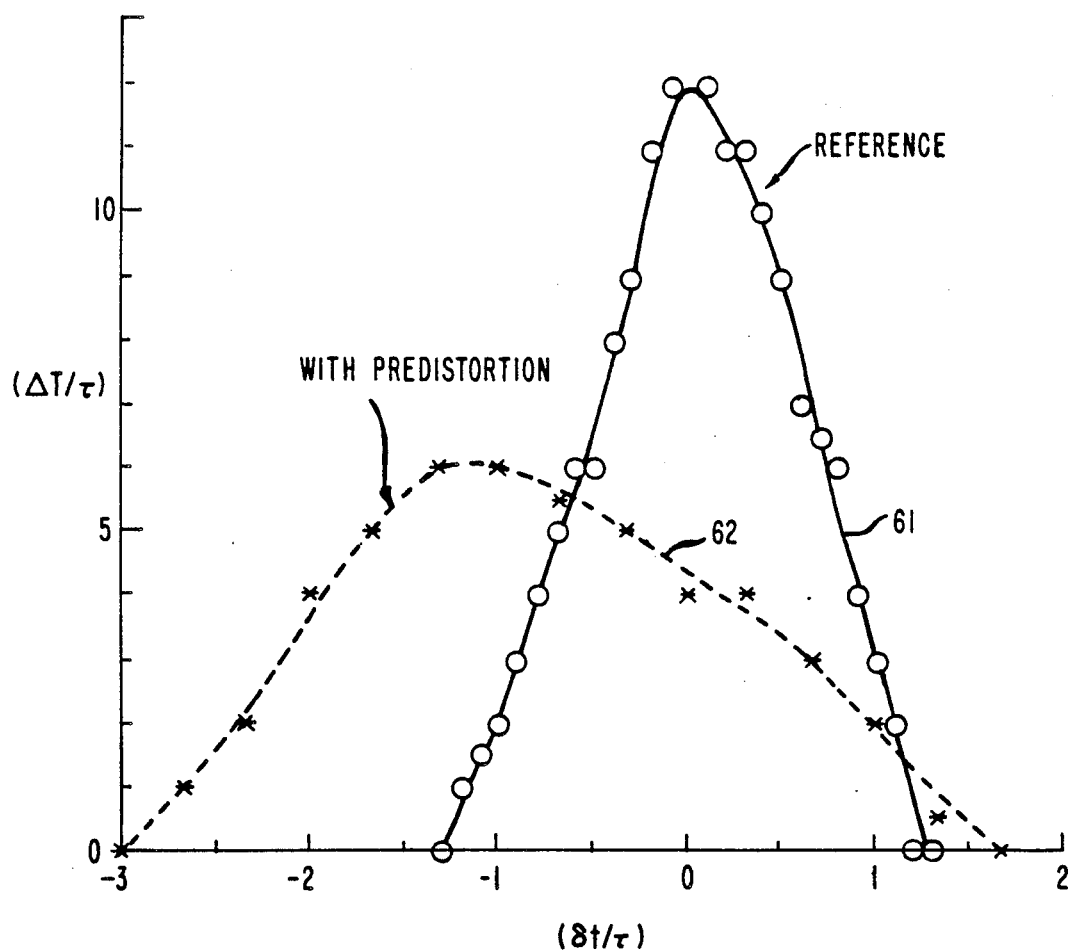
FIG. 6 shows the shift experienced by the control pulse versus the separation between the control and data signal pulses.

FIG. 6 shows two different curves in which the normalized temporal shift ($\Delta T/\tau$) of the control pulse is measured versus the normalized temporal separation ($\delta t/\tau$) between the control and data signal pulses for the arrangement shown in FIG. 1 employing the predistortion element shown in FIG. 4 and described above. Both the normalized temporal shift and the normalized temporal separation are normalized by the pulse width $\tau$. To make the measurements plotted in FIG. 6 for apparatus in FIG. 1, the actual temporal separation $\delta t$ was varied by a stepper motor controlled delay stage (not shown) in the control signal path. Also, a cross-correlator (not shown) was used to measure the resulting actual temporal shift $\Delta T$ of the control signal.

In the examples from experimental practice plotted in FIG. 6, the apparatus in FIG. 1 was configured as follows. Control and data signal pulses were generated by a passively modelocked color center laser providing 500 fs pulses at a nominal center wavelength of 1.685 μm. Fiber 7 was a birefringent fiber having a length of approximately 350 m, a polarization dispersion of $\Delta\beta' \approx 80$ ps/km, a birefringence of $\Delta n = c \times \Delta\beta' \approx 2.37 \times 10^{-5}$, a group velocity dispersion of 8.32 ps/(nm·km), and a zero dispersion wavelength of $\lambda_0 = 1.535$ μm. Control signal pulse C corresponded to an $N=1$ fundamental soliton with an energy of 50 pJ in fiber 7. Data signal pulses S,S' had a signal energy of approximately 22.7 pJ in fiber 7. It should be recalled that fiber 7 provides the proper environment for soliton interaction and, more particularly, for initiating soliton dragging for control pulses propagating therein. In this example, signals C and S' have the proper characteristics to achieve soliton formation in fiber 7. However, it is only necessary that signal C achieve soliton pulse formation in the fiber. Control signal C was injected on the fast axis of fiber 7. As presently understood, signal S' emerging from fiber 49 should have sufficient intensity to affect control signal C through the changes of the nonlinear index in fiber 7.

Sufficient time shifts of control signal C are obtainable use data signal energies below 10 pJ, but larger energies were used in experimental practice to obtain easily measurable time shifts ($\Delta T$) over the separation range ($\delta t$).

The apparatus shown in FIGS. 1 and 4 was employed to obtain data for curve 62, which bears the label "with predistortion." By providing no broadening, that is, by removing predistortion element 4 from FIG. 1, the altered arrangement was employed to obtain data for curve 61, which bears the label "reference." In the curves, a positive temporal separation between the control and data signals corresponds to the condition that the data signal arrived later than the control signal whereas a negative temporal separation between the control and data signals corresponds to the condition that the data signal arrived earlier than the control signal. As expected, curve 61 is substantially symmetric and exhibits the fact that a shift of the control signal pulse by at least $2\tau$ is possible over a separation range $-\tau < \delta t < \tau$. For a normal dispersion fiber in predistortion element 4, the peak shift is reduced by a factor of 2, but the separation range over which an at least $2\tau$ shift is obtained is greatly enlarged to $-2.67\tau < \delta t < \tau$. There is a wider timing window or slot for negative separations because the changing shape of the distorted data signal S' in fiber 7 leads to a net chirp or frequency shift even though the control and signal pulses experience a propagation nearly completely through each other, that is, a nearly complete walk-through. For a separation greater than $1.5\tau$, the pulses do not interact in the birefringent fiber of the optical logic device and, in fact, they continue to walk-off from one another.

From a comparison of the results, it is clear that the use of a predistortion element broadens the timing window from about $2\tau$ to about $3.67\tau$. That is, it is possible to have a mutual delay or temporal separation between the control signal C and the data signal S without deleteriously affecting the soliton interaction in the optical logic device. It is contemplated that the separation and timing window can be extended farther by using, for example, a longer normal dispersion fiber in the predistortion element to further broaden the data signal. Of course, it is understood that, as the timing window or slot is increased for arriving data and control pulses, the expected shift for the control pulse is correspondingly increased.

Figure 7:
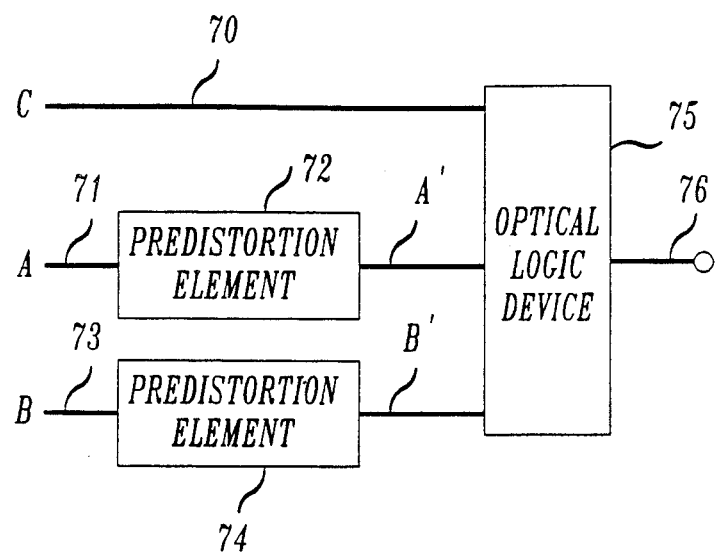
FIG. 7 shows the use of predistortion elements in combination with logic devices adapted for multiple data signal pulses.

An alternative embodiment of the apparatus from FIG. 1 is shown in FIG. 7. This apparatus accommodates multiple data signal inputs A and B. Predistortion element 72 is provided to act on signal A and generate distorted data signal A', whereas predistortion element 74 is provided to act on signal B and thereby generate distorted data signal B'. It is contemplated that one may want to remove one or the other of the predistortion elements shown in FIG. 7. For a complete understanding of soliton based optical logic devices having multiple data signal inputs, see U.S. Pat. No. 5,020,050 cited above.

Figure 8:
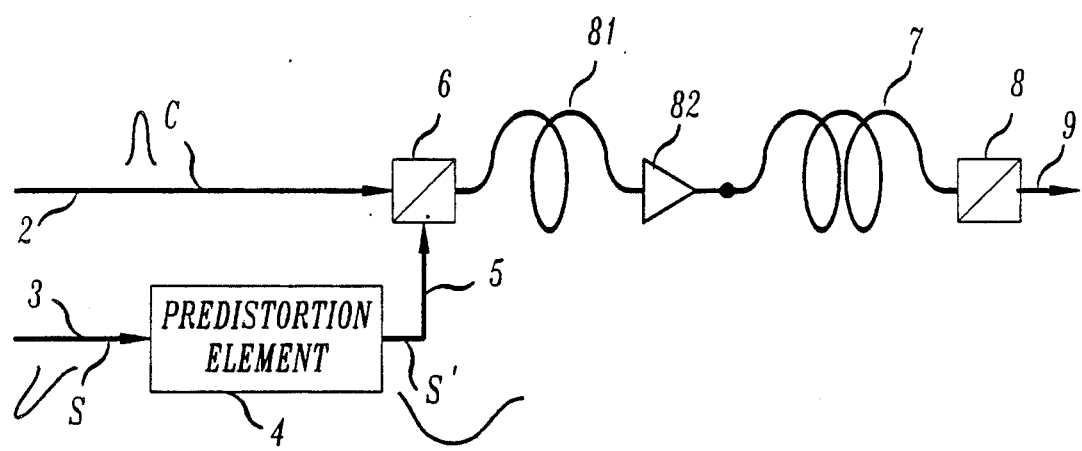
FIG. 8 shows the use of an optical amplifier together with the predistortion element to achieve further relaxation of timing restrictions.

There exists a penalty for relaxing timing restrictions to the apparatus. The penalty is an increase in the minimum switching energy because, as the timing window in made wider, the maximum available time shift $\Delta T$ decreases proportionally. In general, the data signal is required to have sufficient energy to cause a shift $\Delta T$ which is larger than the maximum timing window or separation $\delta t$. It has been found that this limitation can be overcome by including an amplifier (element 82) such as a standard erbium doped fiber amplifier in the input side of the logic device and separated from the input ports by approximately one to two walkoff lengths of birefringent optical fiber (element 81), where the walkoff length is defined as $l_{wo} = c\tau/\Delta n$ (e.g., $2l_{wo} = 11.4$ m for the birefringent fiber described above). This arrangement is shown in FIG. 8. In this arrangement, the predistortion element and optical logic device function as described above. Amplifier 82 causes an amplitude change to the signal pulses which, in turn, causes the chirp on one side of the amplifier to be greater than the chirp on the opposite side. This leads to a net chirp even when the signal pulses passes through one another substantially completely. While the addition of the fiber and amplifier permit further increases in the timing window, it is understood that their addition increases the complexity of the apparatus and restricts the wavelength of operation to the gain band of the amplifier.

I claim:

1. Optical apparatus comprising
a soliton based optical logic means for performing an optical logic operation on first and second signals, said optical logic means having first and second input ports for accepting said first and second signals, respectively, and having an output port at which an output signal is produced indicative of a result of said optical logic operation, said optical logic means supporting soliton propagation therein, and
means coupled to said second input port for predistorting a data signal by temporally broadening a shape characteristic of the data signal via normal dispersion to generate said second signal to insure effective interaction between said second signal and said first signal in the soliton based optical logic means.

2. The optical apparatus as defined in claim 1 wherein a magnitude of temporal separation between said second signal and said first signal is less than approximately three pulse widths, the pulse width being measured for a pulse in the group consisting of said first signal and said data signal.

3. The optical apparatus as defined in claim 2 wherein said predistorting means includes a prescribed length of optical fiber having a normal dispersion characteristic at a wavelength related to said data signal.

4. Optical apparatus comprising
a soliton based optical logic means for performing an optical logic operation on first and second signals, said optical logic means having first and second input ports for accepting said first and second signals, respectively, and having an output port at which an output signal is produced indicative of a result of said optical logic operation, said optical logic means supporting soliton propagation therein, and
means coupled to said second input port for predistorting a data signal by temporally broadening a shape characteristic of the data signal via normal dispersion to generate said second signal to insure effective interaction between said second signal and said first signal in the soliton based optical logic means wherein a magnitude of temporal separation between said second signal and said first signal is less than approximately three pulse widths, the pulse width being measured for a pulse in the group consisting of said first signal and said data signal, said predistorting means includes a Gires-Tournior interferometer having a normal dispersion characteristic at a wavelength related to said data signal.

5. The optical apparatus as defined in claim 2 wherein said predistorting means includes a sequence of at least two dispersive elements having a normal dispersion characteristic at a wavelength related to said data signal, said dispersive elements selected from the group consisting of diffraction gratings and optical prisms.

6. Optical apparatus comprising
a soliton based optical logic means for performing an optical logic operation on first, second, and third signals, said optical logic means having first, second, and third input ports for accepting said first, second, and third signals, respectively, and having an output port at which an output signal is produced indicative of a result of said optical logic operation, said optical logic means supporting soliton propagation therein,
means coupled to said second input port for predistorting a first data signal by temporally broadening a shape characteristic of the first data signal via normal dispersion to generate said second signal to insure effective interaction between said second signal and said first signal in the soliton based optical logic means, and
means coupled to said third input port for predistorting a second data signal by temporally broadening a shape characteristic of the second data signal via normal dispersion to generate said third signal to insure effective interaction between said third signal and said first Signal in the soliton based optical logic means 7. The optical apparatus as defined in claim 6 wherein a magnitude of temporal separation between said first and second data signals and said first signal is less than approximately three pulse widths, the pulse width being measured for a pulse in the group consisting of said first signal and said first and second data signals.

8. The optical apparatus as defined in claim 7 wherein at least one of said predistorting means includes a prescribed length of optical fiber having a normal dispersion characteristic at a wavelength related to said first and second data signals.

9. The optical apparatus as defined in claim 7 wherein at least one of said predistorting means includes a Gires-Tournior interferometer having a normal dispersion characteristic at a wavelength related to said first and second data signals.

10. The optical apparatus as defined in claim 7 wherein at least one of said predistorting means includes a sequence of at least two dispersive elements having a normal dispersion characteristic at a wavelength related to said first and second data signals, said dispersive elements selected from the group consisting of diffraction gratings and optical prisms.

11. Optical apparatus comprising
a soliton based optical logic means for performing an optical logic operation on first and second signals, said optical logic means having first and second input ports for accepting said first and second signals, respectively, and having an output port at which an output signal is produced indicative of a result of said optical logic operation, said optical logic means supporting soliton propagation therein, said optical logic device includes a first length of birefringent optical fiber, a second length of birefringent optical fiber, and an optical amplifier connected between said first and second lengths of optical fiber, said first length being less than or equal to two walkoff lengths, and said second length being greater than said first length, and
means coupled to said second input port for predistorting a data signal by temporally broadening a shape characteristic of the data signal via normal dispersion to generate said second signal to insure effective interaction between said second signal and said first signal in the soliton based optical logic means.

12. The optical apparatus as defined in claim 6 wherein said optical logic device includes a first length of birefringent optical fiber, a second length of birefringent optical fiber, and an optical amplifier connected between said first and second lengths of optical fiber, said first length being less than or equal to two walkoff lengths, and said second length being greater than said first length.

* * * * *